May 22, 1928.
D. G. LORRAINE
1,670,728
OIL AND GAS SEPARATOR
Filed June 3, 1925
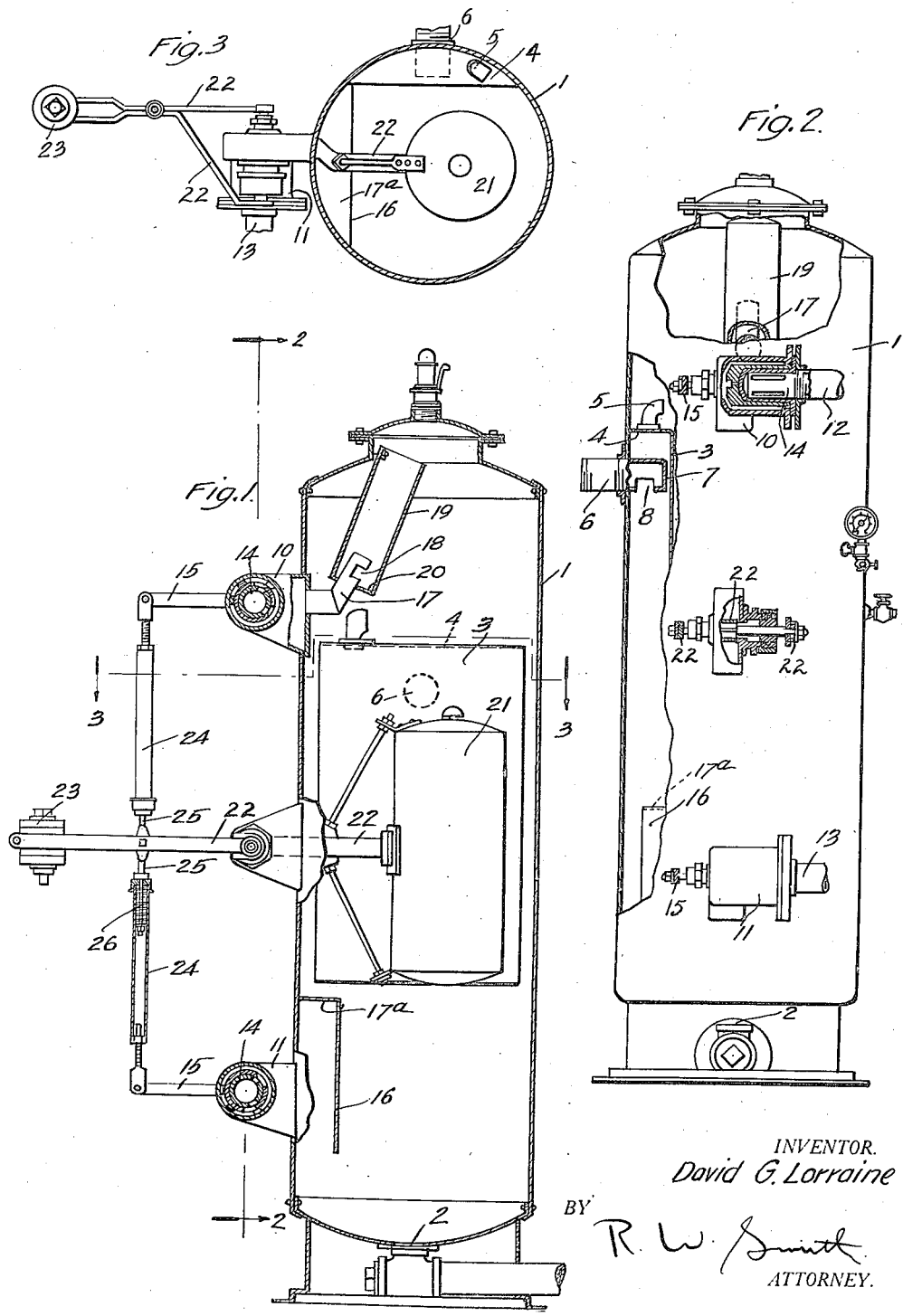
INVENTOR.
David G. Lorraine
BY
R. W. Smith
ATTORNEY.

Patented May 22, 1928.

1,670,728

UNITED STATES PATENT OFFICE.

DAVID G. LORRAINE, OF LOS ANGELES, CALIFORNIA.

OIL AND GAS SEPARATOR.

Application filed June 3, 1925. Serial No. 34,583.

This invention is an oil and gas separator; and it is the object of the invention to settle the oil and relatively heavy foreign material from the gas, and provide valvular discharge means for the oil and gas at the exterior of the device where they will be readily accessible for repairs or replacement, with the valvular discharge means spaced above one another at the oil and gas levels so as to eliminate conduits extending from the respective levels to the valvular means, and a float controlled common actuating means for the valvular controls positioned intermediate thereof at the exterior of the device for simplification of construction.

It is a further object of the invention to provide a cleaning chamber for the gas which rises from the oil, adapted for downward flow of the gas therethrough before its passage to the valvular gas discharge, and having a restricted opening for draining off any oil remaining mixed with the gas.

Further objects of the invention will be readily understood from the following description of the accompanying drawings, in which:

Fig. 1 is a vertical section through the separator.

Fig. 2 is a vertical section on the line 2—2 of Fig. 1.

Fig. 3 is a transverse section on the line 3—3 of Fig. 1.

The separator comprises a closed casing 1 having a sand discharge 2 at the bottom thereof; and provided with a vertical transverse partition 3 at one side of the medial portion of the casing, the sides of said partition meeting the side walls of the casing to form an inlet space in back of the partition, with said inlet space closed at its top by a horizontal partition 4, and opening at its lower end to the main portion of the casing.

A nozzle 5 mounted on partition 4 communicates with the inlet space and forms a horizontal discharge into the main portion of the casing which is circumferentially disposed with relation to the wall thereof. A flow inlet pipe 6 extends through the casing wall and into the inlet space near the top thereof, said pipe being horizontally disposed and having a closed end 7 and a lateral discharge opening 8 at its underside.

As the flow from an oil well enters the inlet space through pipe 6, the lighter gas which immediately separates from the heavier constituents of the flow, will rise in back of partition 3 for discharge through nozzle 5 into the upper portion of the main casing which is a gas chamber; and the remainder of the flow gravitates through the inlet space to the lower part of the main casing which is a settling chamber.

In the settling chamber the heavier sand and water mixed with the flow settles below the oil maintained in a quiescent state, and the gas rises to the gas chamber. The gas discharged through nozzle 5 causes rotary agitation of the entire volume of gas rising into the gas chamber in order to separate by centrifugal action any oil remaining mixed with the gas, so that said oil may gravitate to the settling chamber while dry gas is collected at the top of the gas chamber.

An oil outlet communicates with the settling chamber, and a gas discharge is open to the upper portion of the gas chamber.

The oil and gas discharge means comprise valve casings 10 and 11 mounted on the exterior of tank 1 at the lower portion of the gas chamber and the medial portion of the settling chamber respectively, with gas and oil discharge pipes 12 and 13 extending from the ends of the valve casings.

Rotary valves 14, which are preferably of the type shown in my United States Letters Patent No. 1,532,251 of April 7, 1925, are mounted in casings 10 and 11 for controlling the discharge through pipes 12 and 13, said valves being operated by outwardly projecting operating levers 15.

A baffle 16 is preferably provided in casing 1, and valve casing 10 opens directly into the separator in back of the baffle, which is closed at its upper end to the main portion of casing 1 by a horizontal partition 17ª, and is open at its lower end to the main portion of the casing so that the oil must pass through the lower portion of the settling chamber before entering the oil discharge valve.

Casing 10 for the gas discharge valve is closed to casing 1, but communicates with an upwardly tilted discharge conduit 17 which extends into the separator and is provided with a side intake 18. A cleaning chamber comprising a shell 19 is mounted on conduit 17, and is tilted upwardly in the separator and supported by the wall of casing 1. The upper end of the cleaning chamber is open to the upper portion of the gas chamber, and the lower end of shell 19 is closed around conduit 17, with the intake 18 of said conduit at the lower portion of the shell of the cleaning chamber. A drain opening 20 is provided at the lower side of the closed base of shell 19, so that when the fluid from the upper portion of the gas chamber enters the cleaner shell, any oil remaining mixed with the gas will settle and drain through opening 20 into the settling chamber, while the dry gas flows through intake 18 to the gas discharge valve.

Valves 14 are dependently oppositely opened and closed responsive to variations in the liquid level in the separator, in order to control the discharge of gas and oil. For this purpose a float 21 is mounted in casing 1 upon a rocker arm 22 which projects outwardly through the wall of the casing in vertically spaced relation between the operating levers 15, the outer end of the rocker arm being preferably adjustably counterweighted as shown at 23.

Connecting links are provided between the rocker arm and operating levers 15, and are preferably cushioned structures adapted for respective yielding when arm 22 is rocked to a position for closing the valve in casing 10 or 11. As an instance of this arrangement the links are shown as sleeves 24 fixed to levers 15, and rods 25 connected to the rocker arm and sliding in the sleeves, with springs 26 yieldably retracting the rods relative to the sleeves.

The mounting of valve casings 10 and 11 upon the exterior of the separator permit of convenient access thereto, and the positioning of the casings at the desired level for discharge of oil and gas eliminates the necessity for connecting pipes and the like, and also permits of a simplified and common actuating connection between the valves and the rocker arm of the float.

I claim:

1. A device of the character described comprising a settling chamber, a gas chamber, valvular controls spaced above one another at the exterior of the device for direct communication with the gas chamber and settling chamber respectively, actuating means controlled by the level of a float relative to the device and projecting to the exterior of the device between the valvular controls, and operating connections at the exterior of the device between said actuating means and the respective valvular controls.

2. A device of the character described comprising a settling chamber, a gas chamber above the settling chamber, valvular controls spaced above one another at the exterior of the device for direct communication with the gas chamber and settling chamber respectively, actuating means controlled by the level of a float relative to the device and projecting to the exterior of the device between the valvular controls, and operating connections at the exterior of the device between said actuating means and the respective valvular controls and adapted to cause dependent opposite opening and closing of the valvular controls.

3. A device of the character described comprising a settling chamber, a gas chamber above the settling chamber, valvular controls spaced above one another at the exterior of the device for direct communication with the gas chamber and settling chamber respectively, a float in the device, a rocker arm actuated by the float and extending to the exterior of the device, and operating connections between the rocker arm and the respective valvular controls.

4. A device of the character described comprising a settling chamber, a gas chamber, a cleaning chamber open to the gas chamber at its upper end, and means for withdrawing gas from the device open to the cleaning chamber only adjacent the bottom of said cleaning chamber.

5. A device of the character described comprising a settling chamber, a gas chamber, a cleaning chamber open to the gas chamber at its upper end and having an oil drain at its lower end, and means for withdrawing gas from the device open to the cleaning chamber only adjacent the bottom of said cleaning chamber.

6. A device of the character described comprising a settling chamber, a gas chamber, a cleaning chamber open to the gas chamber at its upper end and having an oil drain at its lower end, and a gas discharge conduit open at its side to the cleaning chamber and extending downwardly therethrough and thence outwardly through the gas chamber.

7. A device of the character described comprising a settling chamber, a gas chamber, a cleaning chamber open to the gas chamber at its upper end and having an oil drain at its lower end, and a gas discharge conduit opening laterally to the cleaning chamber.

8. A device of the character described comprising a settling chamber, a gas chamber, a cleaning chamber open to the gas chamber at its upper end, and a gas discharge conduit opening laterally to the cleaning chamber, said opening permitting communication between the cleaning chamber and the gas discharge conduit only adjacent the bottom of the cleaning chamber.

9. A device of the character described comprising a settling chamber, a gas chamber, a cleaning chamber open to the gas chamber at its upper end and having an oil drain at its lower end, and a gas discharge conduit opening laterally to the cleaning chamber adjacent the bottom of the cleaning chamber.

10. A gas and oil separator comprising a casing, means to enter crude oil into said casing without agitation, oil outlet means, gas outlet means, and a pipe extending to said gas outlet means, whereby the oil particles and gas are separated, said pipe being open at its upper end to receive the gas, and the lower end thereof opening into said gas outlet means.

11. A gas and oil separator comprising a casing, a crude oil inlet pipe, oil outlet means, gas outlet means, and a pipe extending to said gas outlet means, whereby the oil particles and gas are separated, said pipe being open at its upper end to receive the gas, and the lower end thereof opening into said gas outlet means.

In testimony whereof I have affixed my signature to this specification.

DAVID G. LORRAINE.